Figure 1:
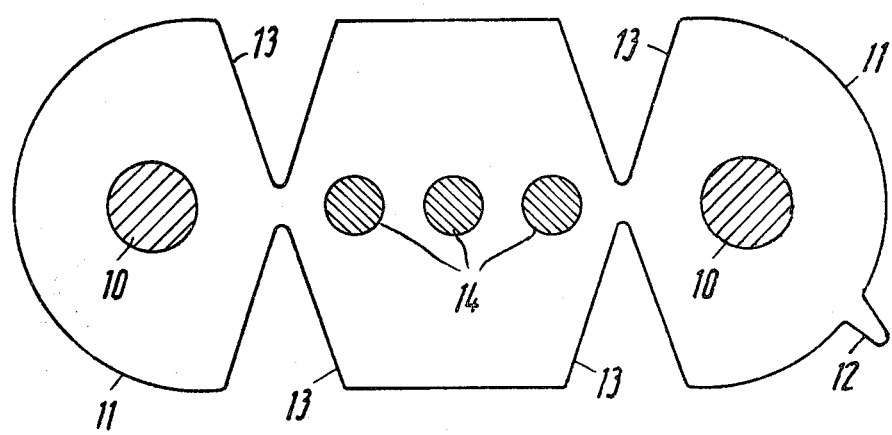

United States Patent [19]

Ney et al.

[11] 4,220,812
[45] Sep. 2, 1980

[54] ELECTRIC CABLE FOR COMMUNICATION PURPOSES

[75] Inventors: Robert P. Ney, Langerwehe-Heistern; Matthias W. Horn, Eschweiler-Kinzweiler, both of Fed. Rep. of Germany

[73] Assignee: Lynenwerk GmbH & Co. Kommanditgesellschaft, Eschweiler, Fed. Rep. of Germany

[21] Appl. No.: 915,755

[22] Filed: Jun. 15, 1978

[30] Foreign Application Priority Data

Jun. 17, 1977 [FR] France .............................. 77 18595

[51] Int. Cl.² .............................................. H01B 7/08
[52] U.S. Cl. .............................. 174/117 F; 174/40 R; 174/41; 174/117 R; 174/121 SR
[58] Field of Search ......... 174/117 R, 117 F, 121 SR, 174/40 R, 41, 70 A; 350/96.23

[56] References Cited

U.S. PATENT DOCUMENTS

| 2,628,998 | 2/1953 | Frisbie | 174/117 F X |
|---|---|---|---|
| 2,663,755 | 12/1953 | McBride | 174/117 R |
| 2,950,338 | 8/1960 | Taylor | 174/117 F X |
| 3,060,260 | 10/1962 | Scofield | 174/41 X |
| 3,458,650 | 7/1969 | Miyawaki | 174/117 F |
| 3,549,788 | 12/1970 | Apen | 174/117 F X |
| 3,927,248 | 12/1975 | Scholl | 174/41 |
| 3,983,313 | 9/1976 | Ney et al. | 174/121 SR |

FOREIGN PATENT DOCUMENTS

| 481628 | 8/1948 | Canada | 174/117 |
|---|---|---|---|
| 2274123 | 6/1974 | France | 174/117 F |
| 414713 | 8/1934 | United Kingdom | 174/117.1 |

Primary Examiner—Richard R. Kucia
Attorney, Agent, or Firm—Becker & Becker, Inc.

[57] ABSTRACT

An electric cable for communication purposes, for instance a one-pair party station cable which is designed as twin cable and includes a cross-section-wise relatively flat envelope or cover of thermoplastics or elastomers and includes conductors arranged in spaced relationship to each other and also includes traction relief members in about the middle between the conductors. The traction relief members are embedded in the envelope or cover and are adapted to exert the traction forces exerted on the cable in the longitudinal direction thereof. The traction relief members include high-strength fibers arranged symmetrically with regard to the longitudinal central plane of the cable and with regard to the conductors. The enveloping substance includes thermoplastics or elastomers.

8 Claims, 3 Drawing Figures

ELECTRIC CABLE FOR COMMUNICATION PURPOSES

The present invention concerns an electric cable for communication purposes for instance a one-pair party station cable which is designed as twin cable and comprises a cross-section-wise relatively flat envelope or cover of thermoplastics or elastomers and includes conductors arranged in spaced relationship to each other, and also includes traction relief means arranged in about the middle between said conductors, said traction relief means being embedded in said cover or envelope and being adapted to absorb the traction forces exerted upon the cable in the longitudinal direction thereof.

With a heretofore known electric cable having the above mentioned features, the traction relief means are formed by a supporting cable and consist of steel wire. Such traction relief means have the drawback that they have a relatively considerable weight and have a relatively poor bending capability which affects the bending capability of the cable. Furthermore, the said known cable has inherent thereto the danger that the supporting cable of steel wire, in case of damage to the cover or envelope, will be exposed to the influence of inclement weather as a result of which the steel wire rusts and may eventually break. This possibility also exists when it is intended to cut the cable, inasmuch as in such an instance moisture can enter the cable from the end face thereof.

The insertion of a conductive metallic traction relief means requires that the latter has to be grounded, whereby the transmitting properties of the cables are affected.

Self-supporting air cables have become known which are built up centrally symmetrical and the outer mantle of which contains longitudinal strands of glass fibers which serve as traction relief means. In this connection, the strands consist of bundles of glass fiber yarns, and the bundles are arranged in a relatively great number along a circular line which symmetrically surrounds the cable core.

It is an object of the present invention to outfit also electric party station cables of the twin or comparable flat construction in such a way that they will have the same advantages as heretofore known air cables without having to incorporate the arrangement of glass fiber strands surrounding the conductors.

It is a further object of this invention to provide an electric party station cable as set forth in the preceding paragraph, which, in comparison to the heretofore known cables with steel wire, will be lighter and more flexible than air cables while also being simpler to handle when installing such cable.

These and other objects and advantages of the invention will appear more clearly from the following specification in connection with the accompanying drawing, in which:

FIG. 1 diagrammatically illustrates a cross section through a one-pair party station cable for telephone communication, which cable is designed as twin cable and has three supporting members.

Figure 2:
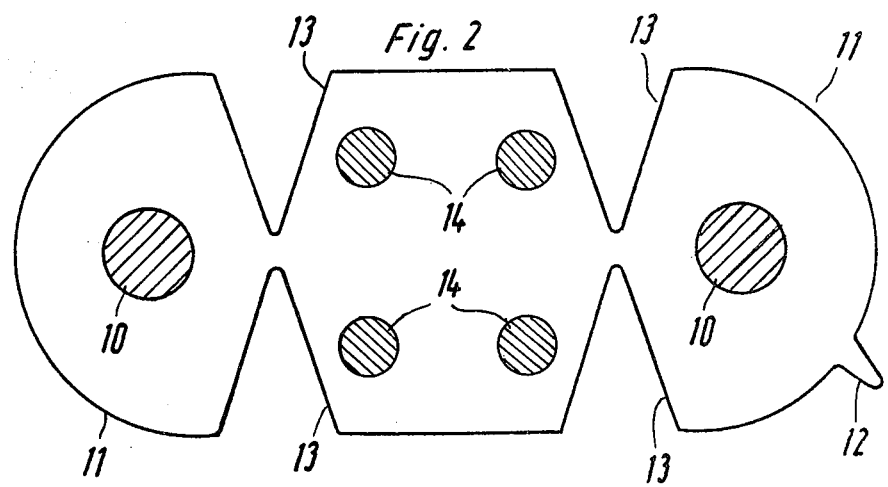
Figure 3:
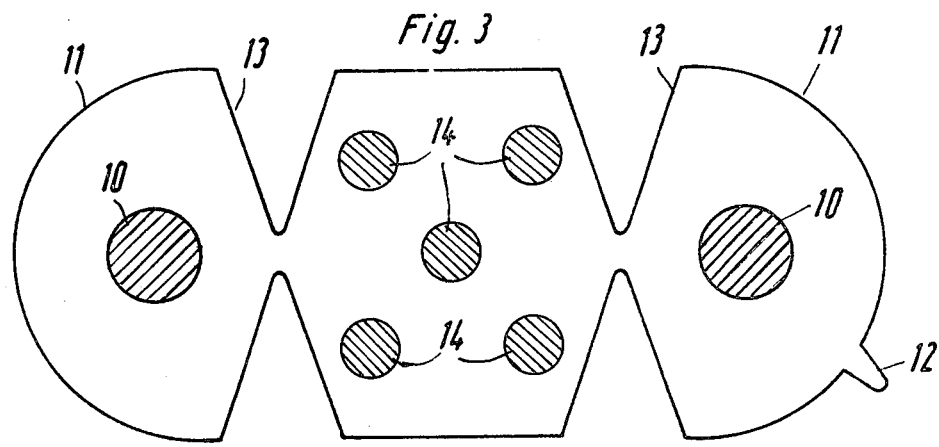

FIGS. 2 and 3 diagrammatically illustrate cross sections through a cable generally of the type illustrated in FIG. 1 with the difference that FIG. 2 has four supporting members whereas FIG. 3 has five supporting members.

The electric cable according to the present invention is characterized primarily in that the traction relief means comprise at least two supporting members which are symmetrically arranged with regard to the conductors and which consist of high-strength fibers. A cable designed in this manner has a relatively light weight, is very flexible, and can easily be handled when installing the cable. Moreover, in contrast to heretofore known cables of the above general type, the cable according to the present invention greatly increases the safety against damage when the cable is being handled because the working with heavy cutting tools is no longer necessary. In particular, the cable according to the invention has the advantage that the line will be practically rot-proof. In this connection, the traction relief means in the form of high-strength fibers for instance glass fibers, graphite fibers, or fibers of aromatic polyamides, offer the greatest resistance against rotting.

According to a further development of the invention, the supporting members of high-strength fibers may on the connecting line between the conductors be arranged parallel adjacent to each other. In this way, a particularly flat cross section of the cable can be realized. If, however, another design is selected so that the supporting members when viewed in cross section are located in an arrangement other than in line, for instance, along the outline of a quadrangle, there exists the possibility of providing a relatively greater number of supporting members in the cable which arrangement is desired in special instances.

Referring now to the drawing in detail, the cable construction comprises primarily two copper conductors 10 which are arranged in spaced relationship to each other and are surrounded by an envelope or cover 11 of high density polyethylene which faces said copper conductors 10 in their position. The cover or envelope 11 has a flat oblong cross section and has rounded edges while one of the narrow sides is provided with an orienting projection 12. The top and bottom sides of the cable envelope 11 are provided with customary longitudinally extending grooves 13.

According to FIG. 1, along a connecting line drawn between the copper conductors 10, there are provided three individual glass fiber strands 14 which respectively are formed of bundles of six glass yarns intertwined with each other. For instance, a bundle may have 60,000 individual glass fiber filaments. The glass fiber strands 14 are not pre-impregnated and join directly with the material of the envelope 11 surrounding said glass fiber strands. During the manufacture of the cables, a positive connection between the supporting members 14 and the envelope 11 is established. In this connection, the supporting members 14 are undulated in the longitudinal direction of the cable whereby the mechanical anchoring or intertwining of the supporting members with the surrounding sleeve or cover 11 is intensified and the bendability of the cable is improved.

According to FIG. 2, the supporting members 14 are arranged in the central portion of the envelope 11 between the grooves 13 along the two imaginary lines evenly spaced from each other and parallel to an imaginary line interconnecting the copper conductors 10. In this way the supporting members 14 define the corners of a quadrangle.

The arrangement of the supporting members 14 according to FIG. 3 corresponds to the arrangement of the supporting members in FIG. 2 with the difference that there is a fifth supporting member arranged which is located symmetrically in the center between the four other supporting members.

It is, of course, to be understood that the present invention is, by no means, limited to the specific showing in the drawing, but also comprises any modifications within the scope of the appended claims.

What we claim is:

1. An electric cable for communication purposes having a flat oblong shape and comprising a plurality of conductors spaced from each other in the transverse direction of said cable, several traction relief means comprising in combination therewith several strength carrier means of high strength fibers arranged symmetrically with regard to the longitudinal central plane of said cable and with regard to said conductors, and an enveloping substance selected from the group consisting of thermoplastic and elastomeric material forming a common housing having said conductors and strength carrier means positively embedded and oriented substantially linearly therein, said carrier means, when viewing a cross section of said cable, comprising two pairs of carrier members spaced from each other in the direction of height of said cable, the carrier members of each pair being located on an imaginary straight line substantially parallel to an imaginary line interconnecting said conductors, and also being spaced from each other in the transverse direction of said cable.

2. An electric cable according to claim 1, in which said carrier means comprise bundles of glass fibers.

3. An electric cable according to claim 1, in which said carrier means comprise graphite fibers.

4. An electric cable according to claim 1, in which said carrier means comprise threads of aromatic polyamide.

5. An electric cable according to claim 1, in which said enveloping substance comprises high-density polyethylene.

6. An electric cable according to claim 1, in which said carrier means are embedded in said enveloping substance in undulated form.

7. An electric cable according to claim 1, in which said enveloping substance is at the two oppositely located wider sides of said cable provided with grooves extending in the longitudinal direction of said cable and in which said carrier means are located in the central section between two adjacent grooves.

8. An electric cable according to claim 1, in which said two pairs of carrier members are arranged so as to form the corners of a quadrangle and in which a fifth carrier member is arranged in substantially the center of said quadrangle.

* * * * *